(12) United States Patent
Woodbury et al.

(10) Patent No.: US 6,328,121 B1
(45) Date of Patent: *Dec. 11, 2001

(54) ULTRA-NARROW AUTOMOBILE STABILIZED WITH BALLAST

(76) Inventors: Richard W. Woodbury; Bryan A. Woodbury, both of N. 14 Howard, #225, Spokane, WA (US) 99201

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,789

(22) Filed: Mar. 31, 1999

(51) Int. Cl.$^7$ ........................................ B60K 1/00
(52) U.S. Cl. ................. 180/65.1; 180/68.5; 180/65.2; 280/755
(58) Field of Search .............. 180/65.1, 68.5, 180/216, 65.2; 280/755, 758, 759

(56) References Cited

U.S. PATENT DOCUMENTS

| | | | |
|---|---|---|---|
| 3,983,952 | * 10/1976 | McKee | 180/65.1 |
| 4,181,188 | * 1/1980 | Dessert | 180/65.1 |
| 4,283,074 | 8/1981 | Tidwell . | |
| 4,313,517 | 2/1982 | Pivar . | |
| 4,482,169 | * 11/1984 | Yim | 280/759 |
| 4,484,648 | 11/1984 | Jephcott . | |
| 4,588,206 | * 5/1986 | Powers | 280/758 |
| 4,798,255 | * 1/1989 | Wu | 180/65.1 |
| 5,307,890 | * 5/1994 | Huang | 180/65.1 |
| 5,343,973 | * 9/1994 | Lanke | 180/211 |
| 5,343,974 | * 9/1994 | Rabek | 180/216 |
| 5,401,055 | * 3/1995 | Pham | 280/755 |
| 5,673,939 | * 10/1997 | Bees et al. | 280/831 |
| 5,690,359 | 11/1997 | Teich . | |
| 5,806,622 | * 9/1998 | Murphy | 180/210 |
| 5,890,554 | * 4/1999 | Sturges | 180/21 |
| 5,960,901 | * 10/1999 | Hanagan | 180/210 |
| 6,056,077 | * 5/2000 | Kobayashi | 180/216 |

* cited by examiner

Primary Examiner—J. J. Swann
Assistant Examiner—James S. McClellan
(74) Attorney, Agent, or Firm—John S. Heyman

(57) ABSTRACT

An ultra-narrow automobile is comprised of a body with an enclosed cabin, a pair of tandem seats inside the cabin, four wheels at the corners of the body, a propulsion system driving at least some of the wheels, and ballast positioned in the body for stability. The cabin is preferably narrow enough to enable two of such automobiles to travel side-by-side on a lane. The ballast is heavy enough and positioned low enough for providing a low center of gravity and a high rollover threshold of preferably about 50 degrees or more. The propulsion system is preferably comprised of an electric motor powered by a fuel cell, and the ballast is preferably comprised of a tank of metal hydride for fueling the fuel cell. The ballast may include dead weight for providing a desired rollover threshold when the batteries are not heavy enough, or when the motor is not an electric motor.

11 Claims, 1 Drawing Sheet

ULTRA-NARROW AUTOMOBILE STABILIZED WITH BALLAST

BACKGROUND OF THE INVENTION

1. Field of The Invention

This invention relates generally to ultra-narrow road vehicles.

2. Prior Art

A conventional automobile or four-wheeled vehicle has one or more rows of seats for at least two people in each row, and is typically about 6 feet (1.83 meters) wide. A conventional two-wheeled motorcycle seats one to two people in front-and-back or tandem seating, and is typically about 3 feet (0.92 meter) wide. Vehicles with two to three wheels are classified as motorcycles, and vehicles with four wheels are classified as automobiles. In the United States, each lane of roadway is about 12 feet (3.66 meters) wide for accommodating one automobile, or up to two motorcycles side-by-side with enough clearance between the motorcycles. Motorcycles are narrow enough to drive between automobiles in adjacent lanes when traffic is congested, and can park between them perpendicularly to the curb. Automobiles are most often used for carrying only a single person, particularly for commuting. Considering the far greater space, material, and fuel consumed by automobiles compared to motorcycles, automobiles are much less efficient at transporting people.

Despite the advantages of motorcycles in heavy traffic, parking, and efficiency, automobiles are preferred by the vast majority of people because they are much easier and safer to drive, and their enclosed cabins provide comfort and sufficient carrying capacity. Therefore, the freeways and streets of urban areas everywhere are congested with automobiles. As the economy and population of urban areas grow, traffic and parking problems are deepened. City governments try to alleviate these problems by urging the public to use carpooling and public transportation. However, these measures have only been met with limited success, because people are reluctant to give up the freedom and convenience they enjoy with their private vehicles. The only remaining solution is to expand roadways, but such a solution is extremely expensive, and often impossible due to the lack of available space.

Narrow body enclosed vehicles have been proposed for increasing transportation efficiency by carrying one or more people in tandem seating. Such vehicles have three or more wheels to keep them upright when stopped. Whereas a conventional automobile is wide enough to be inherently stable in a turn, a truly narrow vehicle is too narrow to avoid falling over onto its side in a turn unless it is stabilized by a stabilizing device. U.S. Pat. No. 4,484,648 to Jephcott and U.S. Pat. No. 4,283,074 to Tidwell disclose vehicles each arranged to tilt or roll toward the inside of a turn by moving the suspension or passenger cabin. In practice, the amount of tilt required is dependent upon the speed and radius of a turn, and the vehicle body must be under precise electronic and hydraulic control. Such tilting systems are complicated and expensive. Further, when an electrical or mechanical failure occurs in the tilting system, the vehicle will go out of control.

U.S. Pat. No. 4,313,517 to Pivar discloses a three-wheeled, wide body vehicle with side-by-side or abreast seating for two people. It has a low center of gravity which is provided by a lightweight cabin positioned on top of batteries. However, the small batteries which are disclosed almost certanly do not provide enough stability. The abreast seating makes it about as wide as a conventional automobile, so that two of such vehicles cannot fit side-by-side on the same lane. The lightweight cabin provides very little crash and weather protection. Further, it has a top speed of only 20 m.p.h. (33 k.p.h.), so that it can never be a commercially viable replacement for conventional automobiles. Even if its power train is modified to enable a higher top speed, its three wheels cannot provide enough turning stability at higher speeds.

All of the prior art vehicles suffer from excessive width, insufficient turning stability, or a lack of safety and comfort, so that none of them are commercially viable. It is clearly difficult to provide a commercially viable combination of features. There is no teaching in any prior art for the importance of a high rollover threshold, which is the maximum allowable lean or tilt from which the vehicle will still right itself onto its wheels. Without a suitably high rollover threshold, a narrow vehicle will fall over onto its side in a turn.

OBJECTS OF THE INVENTION

Accordingly, objects of the present ultra-narrow automobile are:

- to be as narrow as a typical motorcycle for improved maneuverability in heavy traffic and easier parking;
- to be as stable as a conventional wide-body automobile despite its ultra narrow width and lack of body tilting;
- to be fast enough for freeway travel;
- to enclose its occupants in a comfortable and safe cabin;
- to provide familiar handling to drivers who are used to conventional automobiles;
- to be less expensive to build and operate than a conventional automobile; and
- to be a practical and thus commercially viable replacement for conventional automobiles.

Further objects of the present invention will become apparent from a consideration of the drawings and ensuing description.

BRIEF SUMMARY OF THE INVENTION

An ultra-narrow automobile is comprised of a body with an enclosed cabin, a pair of tandem seats inside the cabin, four wheels at the corners of the body, a propulsion system driving at least some of the wheels, and ballast positioned in the body for stability. The cabin is preferably narrow enough to enable two of such automobiles to travel side-by-side on a lane. The ballast is heavy enough and positioned low enough for providing a low center of gravity and a high rollover threshold of preferably about 50 degrees or more. The propulsion system is preferably comprised of an electric motor powered by a fuel cell, and the ballast is preferably comprised of a tank of metal hydride for fueling the fuel cell. The ballast may include dead weight for providing a desired rollover threshold when the batteries are not heavy enough, or when the motor is not an electric motor.

Figure 1:
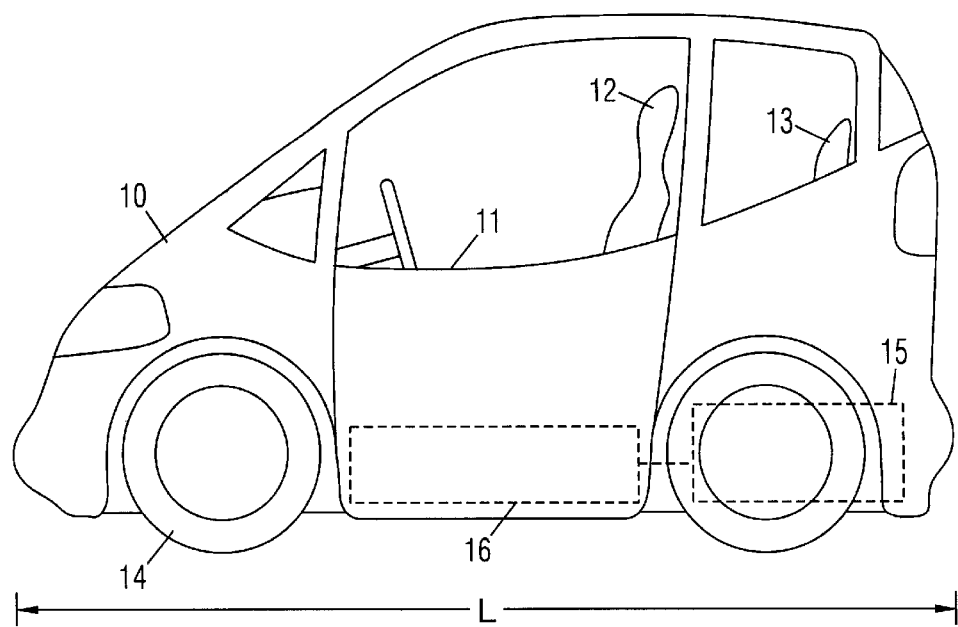
FIG. 1 is a side view of the present ultra-narrow automobile.

| DRAWING REFERENCE NUMERALS | |
|---|---|
| 10. Body | 11. Cabin |
| 12. Front Seat | 13. Rear Seat |
| 14. Wheels | 15. Propulsion System |
| 16. Ballast | L. Length |
| W. Width | CG. Center of Gravity |

DETAILED DESCRIPTION OF THE INVENTION

FIGS. 1–2

Figure 2:
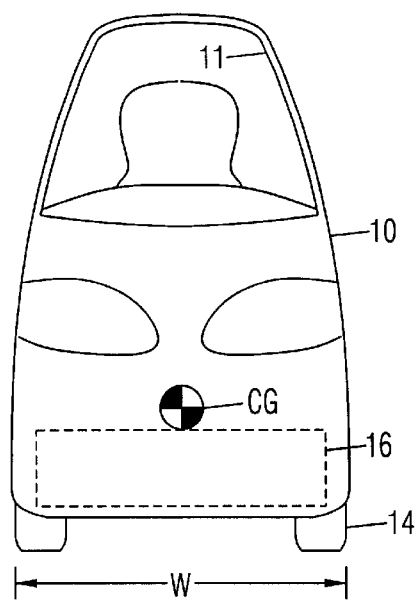
FIG. 2 is a front view of the ultra-narrow automobile.
Figure 3:
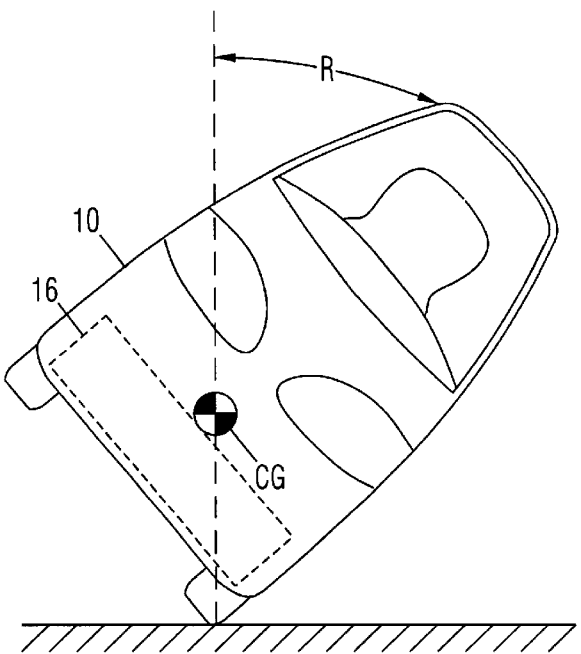
FIG. 3 is a front view of the ultra-narrow automobile tilted to its rollover threshold.

A preferred embodiment of the ultra-narrow automobile is shown in the side and front views in FIGS. 1 and 2, respectively. It includes a body 10 with an enclosed cabin 11 for providing comfort and safety. Alternatively, body 10 can be open for economy. Body 10 preferably has a width W of about 3 feet (0.92 meter) for providing improved maneuverability in heavy traffic and easier parking, particularly for allowing two of the present automobiles to be driven side-by-side on a lane. Its small size also makes it significantly less expensive to build and operate than conventional automobiles. Front and rear seats 12 and 13 respectively are positioned in tandem within cabin 11. Two seats are a preferable compromise between carrying capacity and length. Alternatively, fewer or more seats can be provided, as long as they are arranged in a single column to maintain the narrow width of body 10. The length of body 10 can be varied according to the number of seats provided. In this example with two tandem seats, body 10 preferably has a length L of about 7 feet (2.15 meters).

Four wheels 14 are positioned generally at four corners of body 10 for more stability than three wheels in a hard turn, and for providing familiar handling to drivers who are used to conventional automobiles with four wheels. At least some of wheels 14 are driven by a propulsion system 15, which is preferably an electric motor powered by a fuel cell. Alternatively, other suitable propulsion systems may be used, such as an electric motor powered by batteries, an combustion engine fed by various types of fuel, etc. Ballast 16 is positioned in body 10 between the front and rear wheels for stability, and is preferably comprised of a tank of metal hydride for fueling the fuel cell. Ballast 16 may include dead weight, such as lead, if the metal hydride or batteries are not heavy enough, or if propulsion system 15 is not battery powered.

As an example, propulsion system 15 may be a 200 peak hp and 75 continuous hp AC electric propulsion system from AC Propulsion Company of San Dimas, Calif., and ballast 16 may be batteries weighing about 950 lb. (432 kg.). With a curb weight of about 1600 lb. (727 kg.), the present ultra-narrow automobile is estimated to achieve a range of about 100 miles (161 km.) per charge, a top speed of about 130 m.p.h. (210 k.p.h.), and 0–60 m.p.h. (0–97 k.p.h.) acceleration of less than 5 seconds. Such performance is equivalent to that of a good sports car.

FIG. 3

The ultra-narrow automobile must have excellent stability in turns for safety and market acceptance. It is extremely important that ballast 16 is heavy enough and low enough to provide a center of gravity CG low enough for a rollover threshold R of preferably about 50° from vertical. That is, the present automobile will always right itself onto its wheels as long as it is tilted less than the rollover threshold. The rollover threshold of 50° is achieved in an exemplar vehicle with ballast 16 of about 950 lb. (432 kg.), a curb weight of about 1600 lb. (727 kg.), and a width of about 3 feet (0.92 meter). In comparison, some conventional sports utility vehicles have a rollover threshold of as low as about 38°. The rollover threshold of the present ultra-narrow automobile is at least about as high as a conventional wide-body automobile. Alternatively, the ballast may be arranged for a higher or lower rollover threshold if desired, e.g., 38–60 degrees.

Thus the present ultra-narrow automobile only relies on four wheels and the ballast for stability. Unlike some of the prior art, it does not use any device for leaning into the inside of a turn, so instead it leans to the outside of a turn like a conventional automobile. Therefore, it saves cost, increases reliability, and also provides familiar handling to people who are used to conventional automobiles.

SUMMARY AND SCOPE

Accordingly, an ultra-narrow automobile is provided. It is as narrow as a typical motorcycle for improved maneuverability in heavy traffic and easier parking, and for allowing two of such automobiles to be driven side-by-side on a lane. Despite its ultra narrow width and lack of body tilting, it is as stable as a conventional wide-body automobile. It is as fast as a conventional sports car. It encloses its occupants in a comfortable and safe cabin. It provides familiar handling to drivers who are used to conventional automobiles. It is much less expensive to build and operate than a conventional automobile. It is thus a practical and commercially viable replacement for conventional automobiles.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

We claim:

1. A ultra-narrow automobile comprising:

a body with an enclosed cabin for tandem seating having a length and a width defining four corners and being basically rectangular in shape;

at least one seat in said tandem seating cabin of said body;

said body being about 3 feet or 0.92 meters wide for allowing two of said ultra-narrow automobiles to be driven side-by-side in a standard 12 foot wide traffic lane;

four wheels located one each at said four corners of said body for turning stability, two of said four wheels being front wheels, and two of said four wheels being rear wheels; and a dead weight ballast having a predetermined weight of no less than 500, said ballast positioned low in said body and lying between said front and rear wheels, said ballast providing a center of gravity to a body width ratio such that a safe rollover threshold of at least 38 degrees from vertical is provided despite the narrowness of said automobile.

2. The ultra-narrow automobile of claim 1 wherein said ballast comprises dead weight, such as lead.

3. The ultra-narrow automobile of claim 1 wherein said ballast comprises in part a battery and motor combination.

4. The ultra-narrow automobile of claim 1 wherein said ballast comprises a combination of dead weight, a battery and a motor.

5. The ultra-narrow automobile of claim 1 wherein said ratio of said body width to said center of gravity are such that a safe rollover threshold of about 60 degrees from vertical is provided while still allowing for two of said ultra-narrow automobiles to be able to be driven side-by-side in a standard 12 foot wide traffic lane.

6. The ultra-narrow automobile of claim 1 wherein said predetermined ballast weight of about 950 pounds with a predetermined curb weight for said automobile.

7. The ultra-narrow automobile of claim 1 wherein said safe rollover threshold is about 50 degrees with a predetermined ballast weight of about 950 pounds and a curb weight for said automobile of about 1600 pounds.

8. The ultra-narrow automobile of claim 1 further comprising two seats in tandem within said tandem seating cabin of said body.

9. The ultra-narrow automobile of claim 1 further comprising an electric motor powered by a battery.

10. The ultra-narrow automobile of claim 1 further comprising an electric motor powered by a hydrogen fuel cell.

11. The ultra-narrow automobile of claim 10 wherein said ballast is a tank of mental hydride containing hydrogen for powering said fuel cell.

* * * * *

UNITED STATES PATENT AND TRADEMARK OFFICE
CERTIFICATE OF CORRECTION

PATENT NO. : 6,328,121 B1 Page 1 of 1
DATED : December 11, 2001
INVENTOR(S) : Woodbury et al.

It is certified that error appears in the above-identified patent and that said Letters Patent is hereby corrected as shown below:

Title page,
Item [56], References Cited, "Lanke" should be -- Lanker --.
Item [76], correct the address of inventors to be, -- both of 715 E. Sprague Ave. Suite 114, Spokane, WA 99202 --.
Item [57], ABSTRACT, replace present abstract with the following:
-- An ultra-narrow automobile is comprised of a body with an enclosed cabin, a pair of tandem seats inside the cabin, four wheels at the corners of the body, a propulsion system driving at least some of the wheels, and ballast positioned in the body for stability. The cabin is preferably narrow enough to enable two of such automobiles to travel side-by-side on a lane. The ballast is heavy enough and positioned low enough for providing a low center of gravity and a high rollover threshold of preferably 50 degrees or more. The propulsion system is preferably comprised of an electric motor powered by a hydrogen fuel cell or batteries. The ballast is preferably comprised of a tank of metal hydride (containing the hydrogen which powers the fuel cell) or batteries. The ballast may include dead weight for providing a desired rollover threshold when the hydride or batteries are not heavy enough, or when the motor is not an electric motor. --

Column 4,
Line 38, "A" should be -- An --;
Line 52, cancel "of no less than 500".

Column 6,
Line 8, "mental" should be -- metal --.

Signed and Sealed this

Sixth Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.     : 6,328,121 B1
DATED          : December 11, 2001
INVENTOR(S)    : Woodbury et al.

It is certified that error appears in the above-identified patent and that said Letters Patent is hereby corrected as shown below:

Title page,
Item [56], "Lanke" should be -- Lanker --
Item [76], correct the address of inventors to be, -- both of 715 E. Sprague Ave. Suite 114, Spokane, WA 99202 --.
Item [57], ABSTRACT, replace present abstract with the following:
-- An ultra-narrow automobile is comprised of a body with an enclosed cabin, a pair of tandem seats inside the cabin, four wheels at the corners of the body, a propulsion system driving at lease some of the wheels, and ballast positioned in the body for stability. The cabin is preferably narrow enough to enable two of such automobiles to travel side-by-side on a lane. The ballast is heavy enough and positioned low enough for providing a low center of gravity and a high rollover threshold preferably 50 degrees or more. The propulsion system is preferably comprised of an electric motor powered by a hydrogen fuel cell or batteries. The ballast is preferably comprised of a tank of metal hydride (containing the hydrogen which powers the fuel cell) or batteries. The ballast may include dead weight for providing a desired rollover threshold when the hydride or batteries are not heavy enough, or when the motor is not an electric motor. --

Column 2,
Line 54, after "a" insert -- hydrogen --; same line after "cell" insert -- or batteries --; same line change ",and the" to -- The --.
Line 55, change "for fueling the fuel cell" to -- (containing the hydrogen which powers the fuel cell) or batteries --.
Line 57, after "the" insert -- hydride or --.

Column 4,
Line 38, "A" should be -- An --;
Line 52, cancel "of no less than 500".

UNITED STATES PATENT AND TRADEMARK OFFICE
CERTIFICATE OF CORRECTION

PATENT NO.    : 6,328,121 B1
DATED         : December 11, 2001
INVENTOR(S)   : Woodbury et al.

It is certified that error appears in the above-identified patent and that said Letters Patent is hereby corrected as shown below:

<u>Column 6,</u>
Line 8, "mental" should be -- metal --.

This certificate supersedes Certificate of Correction issued August 6, 2002.

Signed and Sealed this

Thirteenth Day of August, 2002

*Attest:*

*Attesting Officer*

JAMES E. ROGAN
*Director of the United States Patent and Trademark Office*